(12) United States Patent
Ashby

(10) Patent No.: US 7,247,286 B2
(45) Date of Patent: Jul. 24, 2007

(54) PROCESS FOR PRODUCTION OF SODIUM BOROHYDRIDE FROM SODIUM ALUMINUM HYDRIDE WITH RECYCLE OF BYPRODUCTS

(75) Inventor: Eugene Christopher Ashby, Atlanta, GA (US)

(73) Assignee: Rohm and Haas Company, Philadelphia, PA (US)

( * ) Notice: Subject to any disclaimer, the term of this patent is extended or adjusted under 35 U.S.C. 154(b) by 635 days.

(21) Appl. No.: 10/775,280

(22) Filed: Feb. 10, 2004

(65) Prior Publication Data

US 2004/0166044 A1   Aug. 26, 2004

Related U.S. Application Data

(60) Provisional application No. 60/449,913, filed on Feb. 25, 2003.

(51) Int. Cl.
*C01B 35/18*   (2006.01)
(52) U.S. Cl. ................................. 423/288; 423/556
(58) Field of Classification Search ............... 423/288, 423/556
See application file for complete search history.

(56) References Cited

U.S. PATENT DOCUMENTS

| 3,063,791 | A |   | 11/1962 | Kollonitsch et al. |
| 3,886,264 | A | * | 5/1975  | Lindsay et al. ........... 423/512.1 |
| 3,887,691 | A | * | 6/1975  | Kobetz ....................... 423/462 |
| 4,002,726 | A | * | 1/1977  | Filby ........................... 423/287 |
| 4,081,524 | A |   | 3/1978  | Ashby |
| 5,430,165 | A | * | 7/1995  | Cox et al. ................... 556/190 |
| 6,524,542 | B2| * | 2/2003  | Amendola et al. .......... 423/286 |

FOREIGN PATENT DOCUMENTS

| JP | 2-75656   | 3/1990 |
| JP | 11-79733  | 3/1999 |

OTHER PUBLICATIONS

Ashby, Reactions of Complex Metal Hydrides With Borate Esters, J. Organometal. Chem., 1965, 371-381, no month.

* cited by examiner

*Primary Examiner*—Wayne A. Langel
(74) *Attorney, Agent, or Firm*—Kenneth Crimaldi

(57) ABSTRACT

A process for production of sodium borohydride. The process comprises the steps of: (a) combining a boric acid ester, $B(OR)_3$ and sodium aluminum hydride to produce sodium borohydride and $Al(OR)_3$; and (b) combining $Al(OR)_3$ and sulfuric acid to produce alum and ROH.

2 Claims, No Drawings

PROCESS FOR PRODUCTION OF SODIUM BOROHYDRIDE FROM SODIUM ALUMINUM HYDRIDE WITH RECYCLE OF BYPRODUCTS

CROSS REFERENCE TO RELATED PATENT APPLICATIONS

This is a non-provisional application of prior pending U.S. provisional application Ser. No. 60/449,913, filed Feb. 25, 2003.

BACKGROUND

This invention relates generally to a process for production of sodium borohydride from sodium aluminum hydride with recycle of byproducts to improve the overall economics of the process.

Production of sodium borohydride from the reaction of sodium aluminum hydride with a trialkyl borate is disclosed in JP03-275502. This reference suggests that the alkoxy aluminum byproduct could be used by converting it to alumina. However, alumina has relatively low commercial value.

The problem addressed by this invention is to find an efficient and economical process for production of sodium borohydride from sodium aluminum hydride that extracts additional value from the byproducts.

STATEMENT OF INVENTION

The present invention is directed to a process for production of sodium borohydride. The process comprises the steps of: (a) combining a boric acid ester, $B(OR)_3$ and sodium aluminum hydride to produce sodium borohydride and $Al(OR)_3$; and (b) combining $Al(OR)_3$ and sulfuric acid to produce alum and ROH; wherein R represents alkyl, aryl or aralkyl.

In a preferred embodiment of the invention, the process further comprises steps of: (a) combining a boric acid ester precursor and an aliphatic or aromatic alcohol, ROH, to produce a boric acid ester, $B(OR)_3$; and (b) combining sodium, aluminum and hydrogen to produce sodium aluminum hydride.

DETAILED DESCRIPTION

All percentages are weight percentages based on the entire composition described, unless specified otherwise. An "alkyl" group is a hydrocarbyl group having from one to twenty carbon atoms in a linear, branched or cyclic arrangement, and having from 0 to 2 oxygen, nitrogen or sulfur atoms. Alkyl groups may contain 0 to 2 carbon-carbon double bonds. Substitution on alkyl groups of one or more alkoxy groups is permitted. In one preferred embodiment, alkyl groups contain from one to twelve carbon atoms and from 0 to 1 oxygen, nitrogen or sulfur atoms. In another preferred embodiment, alkyl groups contain no carbon-carbon double bonds, and more preferably, no heteroatoms; and most preferably alkyl groups are unsubstituted and contain only carbon and hydrogen. An "aryl" group is a substituent derived from a carbocyclic aromatic compound. An aryl group has a total of from five to twenty ring atoms, and has one or more rings which are separate or fused. Substitution on aryl groups of one or more alkyl, alkenyl or alkoxy groups is permitted. An "aralkyl" group is an "alkyl" group substituted by an "aryl" group. In one preferred embodiment, aryl groups have from six to fifteen ring atoms and contain only carbon and hydrogen.

A "boric acid ester precursor" is a boron-containing compound which can be converted into a boric acid ester, $B(OR)_3$. Preferably, a boric acid ester precursor is an acid or salt containing a $BO_3^{-3}$, $B_4O_7^{-2}$ or $BO_2^{-1}$ group. Examples of the conversion of a boric acid ester precursor to a boric acid ester, $B(OR)_3$, include but are not limited to the following examples:

$$H_3BO_3 + 3ROH \rightarrow B(OR)_3 + 3H_2O$$

$$Na_2B_4O_7 + 12ROH \rightarrow 4B(OR)_3 + 2NaOH + 5H_2O$$

Preferably, the alcohol, ROH, is an aliphatic or aromatic alcohol, i.e., R represents an alkyl or aryl group.

Sodium aluminum hydride is produced from its constituent elements at high temperatures according to the following equation.

$$Na + Al + 2H_2 \rightarrow NaAlH_4$$

For example, U.S. Pat. No. 4,081,524 discloses preparation of sodium aluminum hydride in hydrocarbon solvents at 160° C. and a pressure of 5000 psi (34,000 kPa). Preferably, the reaction is carried out in a solvent consisting essentially of at least one hydrocarbon solvent. Preferred solvents include aromatic hydrocarbon solvents, aliphatic ether solvents, and mixtures thereof. Preferred aromatic hydrocarbon solvents are those in which benzene is substituted by at least one alkyl group, most preferably toluene, xylenes, ethylbenzene, cumene or mesitylene.

The boric acid ester and the sodium aluminum hydride react to form sodium borohydride according to the following equation.

$$NaAlH_4 + B(OR)_3 \rightarrow NaBH_4 + Al(OR)_3$$

Preferably, the sodium borohydride and the aluminum product are separated by dissolving the aluminum product in a suitable solvent in which the sodium borohydride is substantially insoluble. Preferably the solvent is a hydrocarbon solvent. Preferably R is alkyl having at least three carbon atoms, aryl or aralkyl; more preferably R is alkyl having at least four carbon atoms, phenyl, substituted phenyl or benzyl; most preferably R is alkyl having at least six carbon atoms or phenyl.

The aluminum product is treated with sulfuric acid to produce alum, i.e., $Al_2(SO_4)_3$, and an alcohol, ROH, as shown in the following equation.

$$2Al(OR)_3 + 3H_2SO_4 \rightarrow Al_2(SO_4)_3 + 6ROH$$

The alcohol preferably is recycled to the first step of the process to form $B(OR)_3$. The alum is a useful product having greater commercial value than alumina; preferably it is sold to increase the overall economic efficiency of the process.

The invention claimed is:

1. A process for production of sodium borohydride; said process comprising steps of:
    (a) combining a boric acid ester precursor and an alcohol, ROH; wherein R represents alkyl having at least three carbon atoms, aryl or aralkyl; to produce a boric acid ester, $B(OR)_3$;
    (b) combining sodium, aluminum and hydrogen to produce sodium aluminum hydride;
    (c) combining the boric acid ester and the sodium aluminum hydride to produce sodium borohydride and $Al(OR)_3$ and separating sodium borohydride and $Al(OR)_3$ by dissolving $Al(OR)_3$ in a hydrocarbon solvent; and
    (d) combining the $Al(OR)_3$ produced in step (c) and sulfuric acid to produce alum and ROH; wherein ROH produced in step (d) is recycled to step (a).

2. The process of claim 1 in which R is phenyl.

* * * * *